June 4, 1957  M. P. REHORN  2,794,380
STEREOSCOPIC CAMERA OPTICAL SYSTEM
Filed June 23, 1953
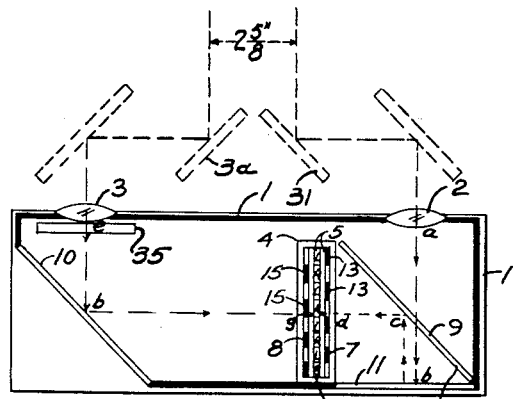
FIG-1-
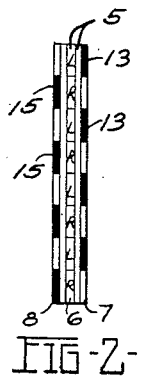
FIG-2-
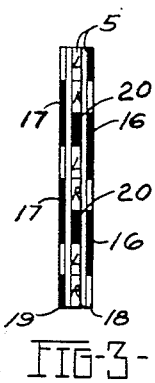
FIG-3-
INVENTOR.
Miles P. Rehorn

United States Patent Office 2,794,380
Patented June 4, 1957

2,794,380
STEREOSCOPIC CAMERA OPTICAL SYSTEM
Miles P. Rehorn, Toledo, Ohio Application June 23, 1953, Serial No. 363,430

6 Claims. (Cl. 95—18)

This invention pertains to stereoscopic cameras.

Specifically it pertains to a stereoscopic camera optical system which may be utilized in stereoscopic photographic cameras of various types.

An object of the invention is to provide means for producing on single strip film in an instantaneous exposure stereograms which comprise alternating right and left eye views.

Another object of the invention is to provide means for producing on single strip film in an instantaneous exposure stereograms which comprise alternating right and left eye views with opaque areas in between each pair of said right and left eye views.

Another object of the invention is to provide a stereoscopic camera optical system which produces such alternating right and left eye views (as above referred to) on the film strip, and produces them in the proper order: that is, properly oriented for projection and viewing or for direct viewing through an appropriate viewing device such as a line screen or a lenticular screen.

Referring to the figures of the drawings:

Fig. 1 is a diagrammatic plan view of a stereoscopic camera which has incorporated within it an optical system which operates according to the principles of the invention.

Fig. 2 is an enlarged view of the film strip and line gratings shown in the camera of Fig. 1 for producing one type stereogram.

Fig. 3 shows a film strip and line gratings which may occupy the same relative positions in the camera as the Fig. 2 elements, but which are for providing another type stereogram.

Referring to Fig. 1 the nature of the invention and the manner in which it operates will now be disclosed: In the figure the walls 1 of a stereoscopic camera are shown. Right and left eye lenses 2 and 3 are shown spaced about 2⅝″ apart (the average distance between the eyes). The film gate 4 contains a film strip 5 with emulsion or photosensitive surface 6 and line grating 7 and 8 comprising opaque and transparent strips. Opposite lens 2 and positioned at an angle of 45° to both lens 2 and the film strip 5 is a partly transmitting partly reflecting body 9 and opposite lens 3 and similarly positioned is mirror 10. The interior of the camera walls 1 are shown black indicating light absorbing areas. The distance a—b—c—d equals that of e—f—g.

The invention operates in the following manner: Light from a subject (not shown) entering right eye lens 2 is transmitted straight through the partly transmitting partly reflecting element 9 (in this case a half mirror) to the mirror surface 11 whence it is returned to the mirror surface 12 of mirror 9 and reflected at right angles ultimately to fall on the areas lettered R on the film emulsion 6 but is blocked from the areas lettered L by the opaque strips 13 of the line grid 7. Also light from the subject passing through lens 3 is reflected from mirror surface 10 at right angles ultimately to fall on the areas lettered L of the film emulsion 6 but is blocked from the areas lettered R by the opaque strips 15 of the line grid 8. The line grids remain stationary. Thus a stereoscopic image is formed comprising alternating right and left eye views. The images are correctly oriented so that the film only needs to developed. It is then ready to be projected for viewing, or it may be directly viewed. In the viewing process either a line screen or a lenticular screen is utilized in the well known manner. The lenticular screen is preferable for reasons pointed out in my co-pending application Serial No. 339,566 filed March 2, 1953, "Stereoscopic Viewing System."

Fig. 3 indicates a form the line grids may take for producing a stereogram of a unique type which may be viewed in stereoscopic relief through a special lenticular screen, said screen forming no part of this invention. In this figure (Fig. 3) the line grids 18 and 19 have opaque strips 16 and 17 which are twice as wide as the transparent areas. Opaque areas 16 and 17 are staggered as shown so as to permit light from the right eye lens 2 to fall only on right eye strips marked R of the film 5 and light from the left eye lens 3 to fall only on the left eye strips marked L of the film 5. The longer opaque strips 16 and 17 produce opaque areas in the finally developed film in that no light reaches the areas 20 of the film 5. The special lenticular screen above referred to and forming no part of this invention, also comprises opaque or blank areas interspersed between lenticules in such a manner as to correspond with and cooperate with the opaque or blank areas 20 of the stereogram disclosed in Fig. 3, for eliminating the pseudoscopic view in the viewing process.

Obviously the optical system may be incorporated in a stereoscopic camera for taking either motion pictures or stills, large photographs of portrait size or 16 mm. size in black and white or color.

For application of the optical system to cameras for taking large photographs of, for example, portrait size, a reflecting mirror arrangement such as shown in Fig. 1 in dotted outline may be utilized to maintain the average distance of 2⅝″ between camera apertures 20 and 31 and at the same time reflect the dual views respectively into the right and left eye camera lenses 2 and 3 which necessarily are spaced a wider distance apart in order to accommodate the larger sized film sheets or plates.

The relative relationships between the various elements of the camera are maintained; the only difference being that all dimensions are increased to a degree depending upon the size of the film sheet or plate.

There are obviously various modifications of the invention which may be resorted to without departing from its scope: For example: The mirrors 9 and 10 may be prisms. Also mirrors 9 and 10 may be reversed with respect to their angular positions and exchange places with each other. That is, mirror 9 would bisect the plane of the present position of Fig. 10 and mirror 10 would bisect the plane of the present position of Fig. 9.

In order to equalize the light intensity of the respective right and left eye views falling upon the film emulsion 6 a smoked, tinted, polarizing or other light decreasing filter 35 may be placed in the path of the light rays which strike the reflecting element 10. Another way of accomplishing such equalization is to make the reflecting element 10 also partly transparent (or light transmitting) like the element 9.

I claim:

1. In a stereoscopic camera optical system the combination comprising binocular apertures for receiving light from a subject from different points of view, dual camera lenses for focusing said light on the respective sides of a photographic sheet the said sheet comprising at least one photo sensitive surface a reflecting means for once reflecting light reaching said reflecting means from one said lens, to one side of the photographic sheet, a second reflecting means for twice reflecting light, reaching said second reflecting means from the other said lens, to the other side of the said photographic sheet, the first said reflecting means comprising a reflecting surface positioned at an angle of 45° to the plane occupied by the said photographic sheet and the second said reflecting means comprising two reflecting elements, one being a partly transmitting partly reflecting body positioned at an angle of 45° to the said photographic sheet and the other being a reflecting element positioned at an angle of 45° to the said partly transmitting partly reflecting body and at an angle of 90° to the said photographic sheet, the said partly transmitting partly reflecting body being for transmitting light from one said lens to the said reflecting element, the said element being for returning the said light to the said body and the said body serving also to reflect the said returned light to the said photographic sheet.

2. The combination of claim 1 including a pair of line grids one on each side of the said photographic sheet, each of the said line grids comprising alternating opaque and transparent areas.

3. In a stereoscopic camera optical system the combination comprising binocular apertures for receiving light from a subject from different points of view, dual camera lenses for focusing said light on the respective sides of a photographic sheet the said sheet comprising at least one photo sensitive surface a reflecting means for once reflecting light reaching said reflecting means from one said lens, to one side of the photographic sheet, a second reflecting means for twice reflecting light, reaching said second reflecting means from the other said lens, to the other side of the said photographic sheet, and a pair of line grids one on each side of the said photographic sheet, each of the said line grids being staggered relative to each other and comprising alternating opaque and transparent areas.

4. The combination of claim 3 the opaque areas on one side of the said photographic sheet being in staggered relation to the opaque areas on the other side of said sheet.

5. The combination of claim 3 the said opaque areas being equal in length to the said transparent areas.

6. The combination of claim 3 the said opaque areas being longer than the said transparent areas.

References Cited in the file of this patent

UNITED STATES PATENTS

| | | |
|---|---|---|
| 1,228,877 | Brewster | June 5, 1917 |
| 1,553,980 | Caps | Sept. 15, 1925 |

FOREIGN PATENTS

| | | |
|---|---|---|
| 120,280 | Germany | Nov. 23, 1898 |
| 344,522 | France | Sept. 6, 1904 |
| 212,294 | Great Britain | Mar. 3, 1924 |